United States Patent
Davis et al.

(10) Patent No.: US 6,661,847 B1
(45) Date of Patent: Dec. 9, 2003

(54) SYSTEMS METHODS AND COMPUTER PROGRAM PRODUCTS FOR GENERATING AND OPTIMIZING SIGNAL CONSTELLATIONS

(75) Inventors: Gordon Taylor Davis, Chapel Hill, NC (US); Ajay Dholakia, Gattikon (CH); Fredy D. Neeser, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,694

(22) Filed: Oct. 29, 1999

Related U.S. Application Data
(60) Provisional application No. 60/134,997, filed on May 20, 1999.

(51) Int. Cl.$^7$ ............................................. H04B 14/04
(52) U.S. Cl. ...................................... 375/242; 375/222
(58) Field of Search ............................... 375/242, 222, 375/265, 229; 341/106

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |
| 4,539,675 A | 9/1985 | Fisher | 370/32 |
| 4,577,310 A | 3/1986 | Korsky et al. | 370/58 |
| 4,578,796 A | 3/1986 | Charalambous et al. | 375/8 |
| 4,720,861 A | 1/1988 | Bertrand | 381/36 |
| 4,731,816 A | 3/1988 | Hughes-Hartogs | 379/98 |

(List continued on next page.)

FOREIGN PATENT DOCUMENTS

| | | | |
|---|---|---|---|
| EP | 0 473 116 A2 | 8/1991 | H04N/1/00 |
| EP | 0 659 007 A2 | 11/1994 | H04M/11/06 |
| EP | 0 669 740 A2 | 12/1994 | H04L/27/00 |
| FR | 2 345 019 | 3/1976 | H04L/27/10 |
| WO | WO 96/18261 | 6/1996 | H04M/11/00 |
| WO | WO 98/37657 | 8/1998 | |

OTHER PUBLICATIONS

Ayanoglu, et al.; *An Equalizer Design Technique for the PCM Modem: A New Modem for the Digital Public Switched Network*; IEEE Transactions on Communications; vol. 46, No. 6; Jun. 1988; pp. 763–774.

Picchi, G. et al.; *A blind Sag–So–DFD–FS equalizer*, Inst. Of Electron. & Telecommun., Pisa Univ., Italy, This paper appears in: Communications, 1988, ICC '88. Digital Technology—Spanning the Universe. Conference Record., IEEE International Conference.

(List continued on next page.)

*Primary Examiner*—Stephen Chin
*Assistant Examiner*—Curtis Odom
(74) *Attorney, Agent, or Firm*—Carlos Munoz-Bustamante; Myers, Bigel, Sibley & Sajovec, P.A.

(57) ABSTRACT

Methods, systems and computer program products are provided for constellation generation which determine initial ucode boundaries and an initial minimum signal level spacing. A work constellation set is generated based on the initial ucode boundaries and the initial minimum signal level spacing. The work constellation set is then iteratively adjusted so as to provide an adjusted work constellation set which achieves an error probability target. The adjusted work constellation set is then iteratively pruned so as to provide a pruned work constellation set which achieves a power limit. The pruned work constellation set is then iteratively fine-tuned so as to provide a final constellation set which is within a specified tolerance of the error probability target and/or the power limit.

69 Claims, 3 Drawing Sheets

U.S. PATENT DOCUMENTS

| | | | |
|---|---|---|---|
| 4,756,007 A | 7/1988 | Qureshi et al. ............... 375/37 |
| 4,760,598 A | 7/1988 | Ferrell ......................... 380/44 |
| 4,792,964 A | 12/1988 | Yoshida ..................... 375/118 |
| 4,797,898 A | 1/1989 | Martinez ....................... 375/7 |
| 4,833,706 A | 5/1989 | Hughes-Hartogs ........... 379/98 |
| 4,868,863 A | 9/1989 | Hartley et al. ................ 379/98 |
| 4,884,285 A | 11/1989 | Heynen et al. ............... 375/25 |
| 4,890,303 A | 12/1989 | Bader ........................ 375/107 |
| 4,890,316 A | 12/1989 | Walsh et al. .................. 379/98 |
| 4,894,847 A | 1/1990 | Tjahjadi et al. ............. 375/121 |
| 4,901,333 A | 2/1990 | Hodgkiss ..................... 375/98 |
| 4,943,980 A | 7/1990 | Dobson et al. ............... 375/42 |
| 4,953,210 A | 8/1990 | McGlynn et al. ............. 380/48 |
| 4,967,413 A | 10/1990 | Otani ....................... 371/37.4 |
| 4,972,360 A | 11/1990 | Cuckier et al. ........ 364/724.04 |
| 4,985,902 A | 1/1991 | Gurcan ........................ 375/14 |
| 4,991,169 A | 2/1991 | Davis et al. .................. 370/77 |
| 4,995,030 A | 2/1991 | Helf ......................... 370/32.1 |
| 5,005,144 A | 4/1991 | Nakajima et al. ........... 364/565 |
| 5,007,047 A | 4/1991 | Sridhar et al. ............ 370/32.1 |
| 5,014,299 A | 5/1991 | Klupt et al. .................. 379/98 |
| 5,033,062 A | 7/1991 | Morrow et al. ................. 375/7 |
| 5,038,365 A | 8/1991 | Belloc et al. ................... 375/8 |
| 5,040,190 A | 8/1991 | Smith et al. .................... 375/4 |
| 5,052,000 A | 9/1991 | Wang et al. .................. 371/43 |
| 5,058,134 A | 10/1991 | Chevillat et al. ............. 375/39 |
| 5,065,410 A | 11/1991 | Yoshida et al. ............... 375/98 |
| 5,067,125 A | 11/1991 | Tsuchida ..................... 370/79 |
| 5,068,875 A | 11/1991 | Quintin ........................ 375/78 |
| 5,107,520 A | 4/1992 | Karam et al. ................. 375/60 |
| 5,111,481 A | 5/1992 | Chen et al. ................... 375/14 |
| 5,119,401 A | 6/1992 | Tsujimoto ..................... 375/14 |
| 5,119,403 A | 6/1992 | Krishnan ...................... 375/39 |
| 5,134,611 A | 7/1992 | Steinka et al. ................ 370/79 |
| 5,142,552 A | 8/1992 | Tzeng et al. .................. 375/14 |
| 5,157,690 A | 10/1992 | Buttle .......................... 375/14 |
| 5,187,732 A | 2/1993 | Suzuki .......................... 379/5 |
| 5,210,755 A | 5/1993 | Nagler et al. ............... 370/108 |
| 5,225,997 A | 7/1993 | Lederer et al. ............. 364/550 |
| 5,249,205 A | 9/1993 | Chennakeshu et al. ..... 375/101 |
| 5,253,272 A | 10/1993 | Jaeger et al. ................. 375/60 |
| 5,253,291 A | 10/1993 | Naseer et al. .............. 379/406 |
| 5,265,151 A | 11/1993 | Goldstein .................... 379/97 |
| 5,271,011 A | 12/1993 | McMullan, Jr. et al. ..... 371/5.3 |
| 5,285,474 A | 2/1994 | Chow et al. .................. 375/13 |
| 5,291,479 A | 3/1994 | Vaziri et al. ............... 370/58.2 |
| 5,293,401 A | 3/1994 | Serfaty ......................... 375/13 |
| 5,309,484 A | 5/1994 | McLane et al. ............. 375/106 |
| 5,311,578 A | 5/1994 | Bremer et al. ................ 379/97 |
| 5,317,594 A | 5/1994 | Goldstein ...................... 375/8 |
| 5,351,134 A | 9/1994 | Yaguchi et al. ............. 358/435 |
| 5,353,280 A | 10/1994 | Ungerböck ................ 370/32.1 |
| 5,386,438 A | 1/1995 | England ..................... 375/121 |
| 5,394,110 A | 2/1995 | Mizoguchi .................. 329/304 |
| 5,394,437 A | 2/1995 | Ayanoglu et al. ........... 375/222 |
| 5,398,303 A | 3/1995 | Tanaka ........................ 395/51 |
| 5,402,445 A | 3/1995 | Matsuura ................... 375/229 |
| 5,406,583 A | 4/1995 | Dagdeviren .................... 375/5 |
| 5,418,842 A | 5/1995 | Cooper ........................ 379/98 |
| 5,432,794 A | 7/1995 | Yaguchi ...................... 371/5.5 |
| 5,434,884 A | 7/1995 | Rushing et al. ............. 375/235 |
| 5,436,930 A | 7/1995 | Bremar et al. .............. 375/295 |
| 5,471,508 A | 11/1995 | Koslov ....................... 375/344 |
| 5,475,711 A | 12/1995 | Betts et al. .................. 375/240 |
| 5,490,169 A | 2/1996 | Blackwell et al. ........... 375/232 |
| 5,491,720 A | 2/1996 | Davis et al. ................. 375/222 |
| 5,513,216 A | 4/1996 | Gadot et al. ................ 375/233 |
| 5,517,213 A | 5/1996 | Bhatt et al. ................. 375/232 |
| 5,519,703 A | 5/1996 | Chauffour et al. ............ 370/84 |
| 5,526,378 A | 6/1996 | Knutson et al. ............. 375/229 |
| 5,528,625 A | 6/1996 | Ayanoglu et al. ........... 375/222 |
| 5,528,679 A | 6/1996 | Taarud ........................ 379/34 |
| 5,533,048 A | 7/1996 | Dolan ........................ 375/222 |
| 5,534,913 A | 7/1996 | Majeti et al. ................... 348/7 |
| 5,546,395 A | 8/1996 | Sharma et al. ................ 370/84 |
| 5,563,908 A | 10/1996 | Kaku et al. ................. 375/222 |
| 5,566,211 A | 10/1996 | Choi .......................... 375/332 |
| 5,588,025 A | 12/1996 | Strolle et al. ............... 375/316 |
| 5,598,401 A | 1/1997 | Blackwell et al. ............ 379/94 |
| 5,625,643 A | 4/1997 | Kaku et al. ................. 375/222 |
| 5,634,022 A | 5/1997 | Crouse et al. .............. 395/704 |
| 5,640,387 A | 6/1997 | Takahashi et al. .......... 370/359 |
| 5,646,958 A | 7/1997 | Tsujimoto ................... 375/233 |
| 5,668,833 A | 9/1997 | Kurokami et al. .......... 375/233 |
| 5,671,250 A | 9/1997 | Bremer et al. .............. 375/222 |
| 5,694,420 A | 12/1997 | Ohki et al. .................. 375/222 |
| 5,710,792 A | 1/1998 | Fukawa et al. .............. 375/229 |
| 5,710,793 A | 1/1998 | Greenberg .................. 375/232 |
| 5,724,393 A | 3/1998 | Dagdeviren ................. 375/296 |
| 5,726,765 A | 3/1998 | Yoshida et al. ............. 358/412 |
| 5,729,226 A | 3/1998 | Betts et al. .................... 341/94 |
| 5,732,104 A | 3/1998 | Brown et al. ............... 375/222 |
| 5,734,663 A | 3/1998 | Eggenberger .............. 371/39.1 |
| 5,742,642 A | 4/1998 | Fertner ....................... 375/233 |
| 5,751,717 A | 5/1998 | Babu et al. ................. 370/466 |
| 5,751,796 A | 5/1998 | Scott et al. ............... 379/93.31 |
| 5,754,594 A | 5/1998 | Betts et al. .................. 375/285 |
| 5,757,849 A | 5/1998 | Gelblum et al. ............ 375/222 |
| 5,757,865 A | 5/1998 | Kaku et al. ................. 375/344 |
| 5,761,247 A | 6/1998 | Betts et al. .................. 375/316 |
| 5,768,311 A | 6/1998 | Betts et al. .................. 375/222 |
| 5,778,024 A | 7/1998 | McDonough ............... 375/216 |
| 5,784,377 A | 7/1998 | Baydar et al. .............. 370/463 |
| 5,784,405 A | 7/1998 | Betts et al. .................. 375/222 |
| 5,784,415 A | 7/1998 | Chevillat et al. ............ 375/341 |
| 5,793,809 A | 8/1998 | Holmquist .................. 375/242 |
| 5,796,808 A | 8/1998 | Scott et al. ............... 379/93.31 |
| 5,801,695 A | 9/1998 | Townshend ................. 375/340 |
| 5,805,669 A | 9/1998 | Bingel et al. ................. 379/28 |
| 5,809,075 A | 9/1998 | Townshend ................. 375/254 |
| 5,812,537 A | 9/1998 | Betts et al. .................. 370/286 |
| 5,815,534 A | 9/1998 | Glass .......................... 375/326 |
| 5,822,371 A | 10/1998 | Goldstein et al. ........... 375/242 |
| 5,825,816 A | 10/1998 | Cole et al. .................. 375/222 |
| 5,825,823 A | 10/1998 | Goldstein et al. ........... 375/286 |
| 5,831,561 A | * 11/1998 | Cai et al. ..................... 341/106 |
| 5,835,532 A | 11/1998 | Strolle et al. ............... 375/233 |
| 5,835,538 A | 11/1998 | Townshend ................. 375/295 |
| 5,838,724 A | 11/1998 | Cole et al. .................. 375/222 |
| 5,839,053 A | 11/1998 | Bosch et al. ............... 455/13.1 |
| 5,844,940 A | 12/1998 | Goodson et al. ............ 375/222 |
| 5,850,388 A | 12/1998 | Anderson et al. ........... 370/252 |
| 5,850,421 A | 12/1998 | Misra et al. ................. 375/354 |
| 5,852,631 A | 12/1998 | Scott .......................... 375/222 |
| 5,862,141 A | 1/1999 | Trotter ........................ 370/468 |
| 5,862,179 A | 1/1999 | Goldstein et al. ........... 375/242 |
| 5,862,184 A | 1/1999 | Goldstein et al. ........... 375/295 |
| 5,870,429 A | 2/1999 | Moran, III et al. .......... 375/222 |
| 5,872,817 A | 2/1999 | Wei ............................ 375/341 |
| 5,881,066 A | 3/1999 | Lepitre ...................... 371/20.5 |
| 5,881,102 A | 3/1999 | Samson ...................... 375/222 |
| 5,887,027 A | 3/1999 | Cohen et al. ................ 375/222 |
| 5,911,115 A | 6/1999 | Nair et al. ..................... 455/63 |
| 5,914,982 A | 6/1999 | Bjarnason et al. ........... 375/222 |
| 5,918,204 A | 6/1999 | Tsurumaru .................. 704/214 |
| 5,926,506 A | 7/1999 | Berthold et al. ............. 375/222 |
| 5,987,069 A | 11/1999 | Furukawa et al. ........... 375/285 |
| 5,999,349 A | 12/1999 | Choi ............................ 360/46 |
| 6,002,723 A | 12/1999 | Chethik ...................... 375/317 |
| 6,005,893 A | 12/1999 | Hyll ............................ 375/260 |
| 6,052,412 A | 4/2000 | Ruether et al. .............. 375/231 |

| | | |
|---|---|---|
| 6,081,822 A | 6/2000 | Hillery et al. ............... 708/445 |
| 6,091,824 A | 7/2000 | Lin et al. ...................... 381/63 |
| 6,141,378 A | 10/2000 | d'Orcye de Lantremange .......... 375/232 |
| 6,148,423 A | 11/2000 | Le Mouel et al. .......... 714/708 |
| 6,151,364 A | 11/2000 | Ruether et al. ............. 375/254 |
| 6,151,614 A | 11/2000 | Ikeda ......................... 708/322 |
| 6,167,095 A | 12/2000 | Furukawa et al. .......... 375/285 |
| 6,240,128 B1 | 5/2001 | Banerjea et al. ............ 375/222 |
| 6,292,654 B1 | 9/2001 | Hessel et al. ............... 455/223 |
| 6,304,594 B1 | 10/2001 | Salinger ...................... 375/222 |
| 6,337,999 B1 | 1/2002 | Orban .......................... 700/94 |
| 6,341,360 B1 | 1/2002 | Abdelilah ................... 714/704 |
| 6,542,551 B1 * | 4/2003 | Okunev et al. ............. 375/242 |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).

Fischer, *Signal Mapping for PCM Modems*, V–pcm Rapporteur Meeting, Sunriver, Oregon, USA, , 5 pgs. (Sep. 4–12, 1997).

Gardner, *Interpolation in Digital Modems—Part I: Fundamentals*, IEEE Transactions on Communications, vol. 41, No. 3, pp. 501–507 (Mar. 1993).

Humblet et al., *The Information Driveway*, IEEE Communications Magazine, pp. 64–68 (Dec. 1996).

Kalet et al., *The Capacity of PCM Voiceband Channels*, IEEE International Conference on Communications '93, pp. 507–511 (Geneva, Switzerland, May 23–26, 1993).

Mueller et al., *Timing Recovery in Digital Synchronous Data Receiver*, IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange*, Japan Radio Co., Ltd., pp. 69–73 (Japan).

Pahlavan et al., *Nonlinear Quantization and the Design of Coded and Uncoded Signal Constellations*, IEEE Transactions on Communications, vol. 39, No. 8, pp. 1207–1215 (Aug. 1991).

Proakis, *Digital Signaling Over a Channel with Intersymbol Interference*, Digital Communications, pp. 373, 381 (McGraw–Hill Book Company, 1983).

Williams et al., *Counteracting the Quantisation Noise from PCM Codecs*, BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream*, ITU–T V.90 (Sep. 1998).

*Series V: Data Communication Over the Telephone Network: Interfaces and voiceband modems; A modem operating at data signalling rates of up to 33 600 bit/s for use on the general switched telephone network and on leased point–to–point 2–wire telephone type circuits*, ITU–T V.34 (10/96).

Bell, R.A., et al., *Automatic Speed Reduction and Switched Network Back–up*, IBM Technical Disclosure Bulletin, vol. 32, No. 1, pp. 154–157 (Jun. 1989).

Abbiate, J.C., et al., *Variable–Data Transmission Modem*, IBM Technical Disclosure Bulletin, vol. 17, No. 11, pp. 3301–3302 (Apr. 1975).

*Data Communication Over the Telephone Network; Procedures for Starting Sessions of Data Transmission Over the General Switched Telephone Network*, ITU–T V.8 (09/94).

*Line Quality Monitoring Method*, IBM Technical Disclosure Bulletin, vol. 18, No. 8, pp. 2726–2726 (Jan. 1976).

*Loopback Tests for V.54 Data Communication Equipment*, IBM Technical Disclosure Bulletin, vol. 32, No. 3A, pp. 295–299 (Aug. 1989).

*On–Line Real Time Modem Testing*, IBM Technical Disclosure Bulletin, vol. 20, No. 6, pp. 2252–2254 (Nov. 1977).

Pierobon, Gianfranco L., *Codes of Zero Spectral Density at Zero Frequency*, IEEE Transactions on Information Theory, vol. IT–30, No. 2, pp. 435–439 (Mar., 1984).

Marcus, Brian H, et al., *On Codes with Spectral Nulls at Rational Submultiples of the Symbol Frequency*, IEEE Transactions on Information Theory, vol. IT–33, No. 4, pp. 557–568 (Jul. 1987).

Fischer, Robert, et al., *Signal Mapping for PCM Modems*, ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies*, ITU–T, Recommendation G.711 (Geneva, 1972).

*Series G: Digital Transmission Systems; Terminal equipments—Coding of analogue signals by pulse code modulation; Pulse code modulation (PCM) of voice frequencies*, ITU–T, Recommendation G.711 (Geneva, 1996).

*Data Communication Over the Telephone Network; Error–Correcting Procedures for DCEs Using Asynchronous–to–Synchronous Conversion*, ITU–T V.42 (03/93).

*Improvement to Spectral Shaping Technique*, Research Disclosure, V. 41, n415,415111, pp. 1550–1551 (Nov. 1998).

*TIA Standard Draft: North American Telephone Network Transmission Model for Evaluating Analog Client to Digitally Connected Server Modems*, Telecommunications Industry Association, PN3857,Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication in Noisy Communication Line Environments*, IBM Technical Disclosure Bulletin, vol. 24, No. 9, pp. 4627–4629 (Feb. 1982).

Godard, D., et al., *Decision Feedback Equalizer Stabilization in Adaptive Mode*, IBM Technical Disclosure Bulletin, vol. 24, No. 11A, pp. 5691–5692 (Apr. 1982).

Borgnis–Desbordes, P., et al., *Variable–Speed Data Transmission*, IBM Technical Disclosure Bulletin, vol. 27, No. 4A, pp. 2269–2270 (Sep. 1984).

Couland, G., et al., *Analog Wrap Self–Test in Modems During Retrain Operations*, IBM Technical Disclosure Bulletin, vol. 28, No. 6, p. 2457 (Nov. 1985).

Maddens, F., *Sixteen–State Forward Convolutional Encoder*, IBM Technical Disclosure Bulletin, vol. 28, No. 6, pp. 2466–2468 (Nov. 1985).

*Remote Modem–Type Self–Learning*, IBM Technical Disclosure Bulletin, vol. 28, No. 6, pp. 2398–2399 (Nov. 1985).

Maddens, F., *Sixteen–State Feedback Convolutional Encoder*, IBM Technical Disclosure Bulletin, vol. 28, No. 10, pp. 4212–4213 (Mar. 1986).

Bell, R. A., et al., *Automatic Speed Reduction and Switched Network Back–up*, IBM Technical Disclosure Bulletin, vol. 32, No. 1, pp. 154–157 (Jun. 1989).

Nobakth, R.A., *Trellis–Coded Modulation Coding Scheme for a 19/2 Kbps Modem*, IBM Technical Disclosure Bulletin, vol. 36, No. 11, pp. 167–170 (Nov. 1993).

Nobakth, R.A., *Unified Table Based Subset Decoder for the Viterbi Algorithm*, IBM Technical Disclosure Bulletin, vol. 37, No. 09, pp. 581–587 (Sep. 1994).

Nobakht, R.A., *Trellis Subset Decoder Algorithm Based on a Pattern Recognition Scheme*, IBM Technical Disclosure Bulletin, vol. 37, No. 10, pp. 693–697 (Oct. 1994).

Abbiate, J.C., et al, *Variable–Data Transmission Modem*, IBM Technical Disclosure Bulletin, vol. 17, No. 11, pp. 3301–3302 (Apr. 1975).

Barlet, J., et al., *Full Speed Recovery in High Speed Modems*, IBM Technical Disclosure Bulletin, vol. 23, No. 2, pp. 641–643 (Jul. 1980).

Dialog Abstract, *Sample rate converter for duplex modem*, European Patent No. 285413.

Dialog Abstract, *Two–speed full–duplex modem for telephone network*, PCT No. WO 8501407.

Dialog Abstract, *Digital data transmission system*, European Patent No. 124674.

Dialog Abstract, *Facsimile communication controller*, Japanese Publication No. 04–175060 (Jun. 23, 1992).

Dialog Abstract, *Picture communication equipment*, Japanese Publication No. 03–120954 (May 23, 1991).

Dialog Abstract, *Radio date transmission system*, Japanese Publication No. 01–179535 (Jul. 17, 1989).

Dialog Abstract, *Facsimile device*, Japanese Publication No. 57–164654 (Oct. 9, 1982).

Dialog Abstract, *Data repeater*, Japanese Publication No. 57–087255 (May 31, 1982).

Dialog Abstract, *Blinding training method for decision feedback equaliser having feed–forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High–speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Naguib, A.F., et al., Dialog Abstract, *A space–time coding modem for high–data–rate wireless communications*, IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communications*, IEICE Transactions on Communications, vol. E81–B, No. 7, pp. 1453–1461 (Jul. 1998).

Naguib, A.F., et al., Dialog Abstract, *A space–time coding modem for high–data–rate wireless communications*, GLOBECOM 97, IEEE Global Telecommunications Conference, vol. 1, pp. 102–109 (1997).

Kobayashi, K., et al., Dialog Abstract, *Fully digital burst modem for satellite multimedia communication systems*, IEICE Transactions on Communications, vol. E80–B, No. 1, pp. 8–15 (Jan. 1997).

Skellern, D.J., et al., Dialog Abstract, *A high speed wireless LAN*, IEEE Micro, vol. 17, No. 1, pp. 40–47 (Jan.–Feb. 1997).

Enomoto, K., et al., Dialog Abstract, *A mode switching type burst demodulator AFC*, Transactions of the Institute of Electronics, Information and Communication Engineers, vol. J76B–II, No. 5, pp. 415–421 (May 1993).

Betts, W., Dialog Abstract, *Nonlinear encoding by surface projection*, International Conference on Data Transmission—Advances in Modem and ISDN Technology and Applications (Sep. 23–25, 1992).

Schilling, D.L., et al., Dialog Abstract, *The FAVR meteor burst communication experiment*, Military Communications in a Changing World MILCOM '91 (Nov. 4–7, 1991).

Jacobsmeyer, J.M., Dialog Abstract, *Adaptive trellis–coded modulation for bandlimited meteor burst channels*, IEEE Journal on Selected Areas in Communications, vol. 10, No. 3, pp. 550–561 (Apr. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems*, COMSAT Technical Review, pp. 195–234 (Fall 1989).

Sato, T., et al., Dialog Abstract, *Error–free high–speed data modem*, Oki Technical Review, vol. 56, No. 133, pp. 20–26 (Apr. 1989).

Seo, J.–S, et al., Dialog Abstract, *Performance of convolutional coded SQAM in hardlimited satellite channels*, IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use*, IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels*, International Conference on Digital Processing of Signals in Communications, pp. 165–172 (United Kingdom, 1985).

Filter, J.H.J., Dialog Abstract, *An algorithm for detecting loss of synchronisation in data transmission test sets (modems)*, Transactions of the South African Institute of Electrical Engineers, vol. 76, No. 1, pp. 39–43 (Jan. 1985).

Gersho, A., Dialog Abstract, *Reduced complexity implementation of passband adaptive equlizers*, IEEE Journal on Selected Areas in Communications, vol. SAC–2, No. 5, pp. 778–779 (Sep. 1984).

Dialog Abstract, *High–speed full–duplex modem reduces telephone connect time*, EDN, vol. 27, No. 18, p. 77 (Sep. 15, 1982).

Chadwick, H., et al., Dialog Abstract, *Performance of a TDMA burst modem through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking*, IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightwave transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mach 1997).

Umehira, M., et al., Dialog Abstract, *Design and performance of burst carrier recovery using a phase compensated filter*, Transactions of the Institute of Electronics, Information and Communication Engineers, vol. J78B–II, No. 12, pp. 735–746 (Dec. 1995).

De Bot, P., et al., Dialog Abstract, *An example of a multi–resolution digital terrestrial TV modem*, Proceedings of ICC '93—IEEE International Conference on Communications, vol. 3, pp. 1785–1790 (Switzerland, May 23–26, 1993).

Lei, Chen, et al., Dialog Abstract, *Single–tone HF high speed data modem*, Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems*, IEEE Communications, vol. 32, No. 7, pp. 42–53 (Jul. 1994).

Sato, T., et al., Dialog Abstract, *Vehicle terminal equipment with dedicated DSP*, Oki Technical Review, vol. 58, No. 144, pp. 49–52 (Jul. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Tamm, Yu.A., Dialog Abstract, *The effect of suppressing harmonic interference using an adaptive equalizer*, Elektrosvyaz, vol. 45, No. 3, pp. 5–10 (Mach 1990).

Saleh, A.A.M., et al., Dialog Abstract, *An experimental TDMA indoor radio communications systemusing slow frequency hopping and coding*, IEEE Transactions on Communications, vol. 39, No. 1, pp. 152–162 (Jan., 1991).

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles*, Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels*, $38^{th}$ IEEE Vehicular Technology Conference: 'Telecommunications Freedom—Technology on the Move', pp. 489–496 (Jun. 15–17, 1988).

Dialog Abstract, *1200–bit/s cellular modem DLD03H*, Oki Technical Review, vol. 53, No. 127, pp. 70–72 (Jul. 1987).

Chamberlin, J.W., et al., Dialog Abstract, *Design and field test of a 256–QAM DIV modem*, IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network*, International Journal of Satellite Communications, vol. 3, Nos. 1–2, pp. 145–160 (Jan.Jun., 1985).

Shumate, A., Dialog Abstract, *Error correction coding for channels subject to occasional losses of bit count integrity*, IEEE Military Communications Conference, vol. 1, pp. 89–83 (Oct. 21–24, 1984).

Suyderhoud, H., et al., Dialog Abstract, *Investigation of 9.6 kb/s data transmission via a PCM link at 64 kb/s with and without link errors*, International Journal of Satellite Communications, vol. 2, No. 1, pp. 81–87 (Jan.–Mar., 1984).

Smith, C., Dialog Abstract, *Relating the performance of speech processors to the bit error rate*, Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors*, Sixth International Conference on Digital Satellite Communications Proceedings, pp. 26–33 (Sep. 19, 23, 1983).

Kittel, L., Dialog Abstract, *Analogue and discrete channel models for signal transmission in mobile radio*, Frequenz, vol. 36, Nos. 4–5, pp. 153–160 (Apr.–May 1982).

Farrell, P.G., et al., Dialog Abstract, *Soft–decision error control of h.f. data transmission*, IEE Proceedings F (Communications, Radar, and Signal Processing), vol. 127, No. 5, pp. 389–400 (Oct. 1980).

Johnson, A.L., Dialog Abstract, *Simulation and implementation of a modulation system for overcoming ionospheric scintillation fading*, AGARD Conference Proceedings No. 173 on Radio Systems and the Ionosphere, pp. 3/1–5 (Greece, May 26–30, 1975).

Matsumura, K., et al., Dialog Abstract, *Anti–interference data–transmission set of HF radio equipment*, Mitsublishi Electric Engineer, No. 41, pp. 18–23 (Sep., 1974).

Blank, H.A., et al., Dialog Abstract, *A Markov error channel model*, 1973 National Telecommunications Conference, vol. 1, pp. 15B/1–8 (Nov. 26–28, 1973).

McGruther, W.G., Dialog Abstract, *Long term error performance data for operation at 2400 bps ona nonswitched private line network*, Summaries of papers presented at 1970 Canadian symposium on communications, pp. 65–66 (Canada, Nov. 12–13, 1970).

Burton, H.O., et al., Dialog Abstract, *On the use of error statistics from data transmission on telephone facilities to estimate performance of forward–error–correction*, 1970 international conference on communications, p. 21 (Jun. 8–10, 1970).

Bowen, R.R., Dialog Abstract, *Application on burst error correction codes to data modems for dispersive channels*, Proceedings of the 1970 international symposium on information theory, p. 1 (Netherlands, Jun. 15–19, 1970).

Pierce, A.W., et al., Dialog Abstract, *Effective application of forward–acting error–control coding to multichannel h.f. data modems*, IEEE Transactions on Communication Technology, vol. Com–18, No. 4, pp. 281–294 (Aug. 1970).

West, R.L., Abstract, *Data Concentration Method*, IBM Technical Disclosure Bulletin, pp. 487–489; http://w3.infogate.ibm.com:1207/SESS506884/GETDOC/39/2/1 (Jul., 1975).

Haas, L.C., et al., Abstract, *Received Line Signal Quality Analysis*, IBM Technical Disclosure Bulletin, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer*, IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system*, PCT No. WO 9310607.

Dialog Abstract, *Reduced time remote access method for modem computer*, PCT No. WO 9209165.

* cited by examiner

SYSTEMS METHODS AND COMPUTER PROGRAM PRODUCTS FOR GENERATING AND OPTIMIZING SIGNAL CONSTELLATIONS

CROSS REFERENCE TO RELATED APPLICATIONS

The present application is related to and claims priority from U.S. Provisional Application Serial No. 60/134,997, entitled APPARATUS, METHOD AND COMPUTER PROGRAM PRODUCT FOR GENERATING AND OPTIMIZING SIGNAL CONSTELLATIONS filed May 20, 1999, the disclosure of which is incorporated herein by reference as if set forth fully herein.

This application is related to U.S. application Ser. No. 09/264,085, entitled RECEIVERS, METHODS, AND COMPUTER PROGRAM PRODUCTS FOR AN ANALOG MODEM THAT RECEIVES DATA SIGNALS FROM A DIGITAL MODEM (Docket No. RA9-98-074), U.S. application Ser. No. 09/264,272, entitled MODEMS, METHODS, AND COMPUTER PROGRAM PRODUCTS FOR IDENTIFYING A SIGNALING ALPHABET IN VARIANCE WITH AN IDEAL ALPHABET DUE TO DIGITAL IMPAIRMENTS (Docket No. RA9-98-075), U.S. application Ser. No. 09/264,475, entitled MODEMS, METHODS, AND COMPUTER PROGRAM PRODUCTS FOR SELECTING AN OPTIMUM DA TA RATE USING ERROR SIGNALS REPRESENTING THE DIFFERENCE BETWEEN THE OUTPUT OF AN EQUALIZER AND THE OUTPUT OF A SLICER OR DETECTOR (Docket No. RA9-98-077), which are incorporated herein by reference.

FIELD OF THE INVENTION

The present invention relates generally to the field of modems, and, more particularly, to the construction and optimization of signal constellations for data transmission based on available signal alphabets that are either known a priori, determined through identification of model parameters, or estimated during modem start-up by means of learning techniques.

BACKGROUND OF THE INVENTION

Figure 1:
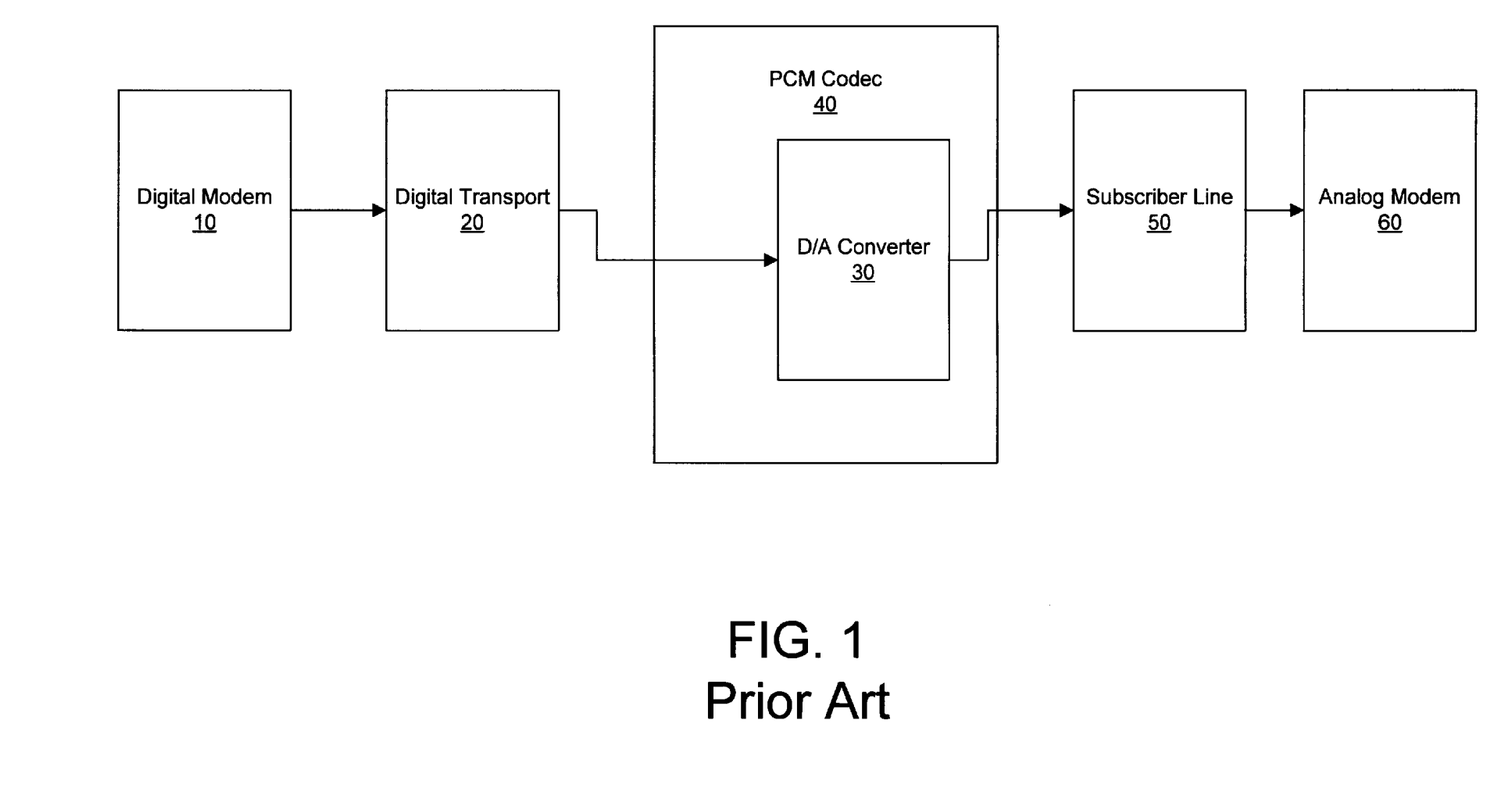
FIG. 1 is a block diagram showing the PCM modem communication channel in accordance with the prior art.

Although the preferred embodiment will be described with respect to a pulse code modulation (PCM) modem, the present invention is in no way limited to PCM type modems and may be used with non-PCM modems. The present invention relates to the construction and optimization of signal constellations for the downlink of a PCM modem communication, system. The communications channel of interest for PCM modems is shown in FIG. 1. A digital modem 10 is connected to the digital transport 20, which is connected by means of a D/A converter 30 in a PCM codec 40 to the subscriber line 50. An analog modem 60 is connected to the opposite end of the subscriber line 50.

PCM modems such as modems according to ITU-T Recommendation V.90 employ pulse-amplitude modulation (PAM) for downstream signaling, where the signal constellations are sets of PCM codes according to the ITU-T Recommendation G.711 transmitted by the digital modem and corresponding voltage levels, at a given point of reference. Unless specified otherwise, the point of reference will be the output of the D/A converter 30 in the PCM codec 40, which is typically located at the Central Office.

For downstream data transmission according to Recommendation V.90, data bits are mapped to PCM codes according to Recommendation G.711 by the digital modem. The PCM codes are sent through the digital network and converted to analog voltage levels by the D/A converter in the PCM codec 40 of the Central Office. In mu-law networks, robbed-bit signaling (RBS) is often used for in-band call control, which results in the least-significant bit of a PCM code being unavailable for PCM modem data transmission. Moreover, digital attenuation pads with numerous attenuation levels and implementation characteristics are employed in the digital network. Both RBS and digital attenuation pads act as impairments from the perspective of PCM modem data transmission.

Due to the frame structure present on digital T1 links, a frame size of 6 modulation intervals T (6 samples at 8000 samples/second) was selected for downstream data transmission in V.90. Generally, the combination of impairments, such as RBS, digital pads, and PCM codec infidelity, may be different for each interval of a 6T frame. Since certain clusters of PCM codes are mapped by the digital impairments to the same PCM code, only a subset of non-overlapping PCM codes (with one representative from each cluster) can be used for data signaling in any of the 6 intervals, and the 6 subsets are generally different. Recommendation G.711 specifies the voltage levels at the D/A converter output corresponding to the 256 PCM codes. However, the subset of these PCM codes that is actually used is not known in advance. Moreover, the true voltage levels corresponding to these remaining PCM codes may differ significantly from the ideal levels specified by G.711 due to PCM codec infidelity and other impairments.

The presence of a priori unknown impairments in both the digital network and the PCM codec may require precise identification of the voltage levels corresponding to transmitted PCM codes, independently for each interval of a frame (cf. related U.S. application Ser. No. 09/264,272). The Recommendation V.90 uses a frame size of 6 modulation symbols, at a rate of 8000 symbols/second. In V.90 start-up, for example, this identification can be accomplished by the analog modem by using the DIL (Digital Impairment Learning) sequence of Phase 3 of the startup procedure. After an initial training of the analog modem's equalizer (cf. related U.S. application Ser. No. 09/264,085), the voltage levels (i.e. signal levels) corresponding to transmitted PCM codes are learned separately for each interval in a frame of 6 modulation intervals.

The V.90 Recommendation allows up to 6 different signal constellations, which may be selected and assigned to intervals of a data frame by the analog modem. These constellations may be selected with a suitable spacing between adjacent signal levels to allow for reliable data transmission in the presence of noise and other distortions while maximizing the data rate subject to a constraint on average power. In practice, reliability is specified in terms of a desired probability of symbol error.

A significant constraint may be the power limit as well as the point of reference for measuring power imposed by country-specific regulations. The power limit and point of reference are sent by the digital modem to the analog modem during V.90 start-up. If the point of reference is at the output of the PCM codec and the presence of digital pads is detected, the analog modem can compensate for the attenuation and achieve higher data rates.

The problem of constellation generation in a V.90 modem is made significantly more difficult by the wide range of PCM-modem specific impairments under which near-optimal constellations must be selected. Another complication is that the impairments encountered for a particular connection may be unpredictable and may change from call to call. Furthermore, a V.90 modem may have only a limited amount of time available during start-up for selecting optimal signal constellations.

The problem of constellation generation for PCM modems was described in a TR-30.1 contribution by R. Fischer and G. Ungerboeck. However, no practical solution for solving the optimization problem with finite computational resources was proposed. Also, in U.S. Pat. No. 5,831,561 (hereinafter "the '561 patent"), the use of learned levels as the source of a signaling alphabet is described. However, little detail is provided as to how to build a constellation other than by selecting a larger number of available points and then reducing the number of points to the desired number of points by optimizing the minimum distance between points. Thus, the '561 patent assumes a first data rate and then finds an achievable data rate based on the assumed data rate. The assumption of a first data rate is not necessary in the present invention.

SUMMARY OF THE INVENTION

Certain objects, advantages, and features of the invention will be set forth in the description that follows and will become apparent to those skilled in the art upon examination of the following or may be learned with the practice of the invention.

It is an object of the present invention to provide an improved method for the selection and optimization of a set of signal constellations for data transmission.

It is another object of the present invention that it can be used in a V.90 client or other PCM modem to select a set of signal constellations for downstream data transmission.

It is yet another object of the present invention to allow for the selection of near-optimal signal constellations as subsets of available signal alphabets. Specifically, for PCM modem channels, the available signal alphabets are dependent on the digital impairments encountered in a particular modem connection.

Another object of the present invention is to reduce or eliminate dependencies on a precise model of the impairments in the digital network and the PCM codec in constellation generation.

A further object of the present invention is to automatically take into account the effect of impairments for a wide range of PCM-modem specific impairments.

Another object of the present invention is to provide flexibility in selecting the signal constellations for different power limits and target error probabilities.

These and other objects of the present invention may be provided by methods, systems and computer program products for constellation generation which determine the range of available and usable ucodes and an initial minimum spacing between signal levels. A work constellation set is generated based on the initial range of ucodes and the initial minimum signal level spacing. The work constellation set is then iteratively adjusted so as to provide a work constellation set which achieves an error probability target. The work constellation set is then iteratively pruned so as to provide a pruned work constellation set which achieves a power limit. The pruned work constellation set is then iteratively fine-tuned so as to provide a final constellation set which is within a specified tolerance of the error probability target and/or the power limit.

In a further embodiment, the power limit may be enforced utilizing an exact distribution of the final constellation.

Furthermore, the initial minimum signal level spacing may be determined based on mean squared error and a target symbol error probability.

In a particular embodiment of the present invention, the work constellation set is iteratively adjusted by reducing the minimum signal level spacing in order to approximate a target symbol error probability. Such an iterative reduction may be achieved by iteratively reducing the minimum signal level spacing until the symbol error probability of the work constellation set slightly exceeds a target symbol error probability. Furthermore, the minimum signal level spacing may finally be set to a value between a first minimum signal level spacing which results in a work constellation set with a symbol error probability below the target symbol error probability and the minimum signal level spacing which results in the symbol error probability of the work constellation set slightly exceeding the target symbol error probability.

In another embodiment of the present invention, the work constellation set is iteratively pruned by eliminating a largest signal level from the work constellation set. The iterative elimination of the largest signal level in the work constellation set is repeated until a constellation power below the power limit is reached.

In still another embodiment of the present invention, the work constellation set is iteratively fine-tuned by increasing the minimum signal level spacing until the constellation power of the resulting work constellation set is within a threshold value of the power limit. Furthermore, the multiplicity of signal levels which are at the minimum spacing with respect to a neighboring signal level, may also be reduced to fine-tune the work constellation set.

In preferred embodiments of the present invention, the work constellation sets at different stages of the described optimization have a signal-point distribution that is close to uniform, simplifying the computation of average power or symbol error probability.

In still another embodiment of the present invention, the initial minimum signal level spacing is established as a function of mean squared error.

In particular embodiments of the present invention, the minimum signal level spacing is reduced by determining $$d_{\min,LB} = \min_{0 \leq i \leq 5} \min(2c'_{i,0}, c'_{i,1} - c_{i,0})$$

where $d_{min,LB}$ is the minimum signal level spacing and $c'_{i0}$ and $c'_{i1}$ are reduced smallest and second smallest signal levels and $c_{i,0}$ is a previous smallest signal level of the work constellation set and wherein i is a frame interval. Furthermore, the largest level which is pruned may be the largest level satisfying $(M_i-1)(P-Q) \geq Q$, wherein $M_i$ is a number of levels being used in a frame interval i, P is the product of all the $M_i$ values and Q is $2^K$ where $K=\lfloor \log_2(P) \rfloor$.

If the attenuation due to digital pads in the network is known, the present invention may benefit from this knowledge by taking it into account in the computation of average power. Moreover, the present invention may provide fine control on how closely the power limit or error probability target are approximated. The present invention also is memory efficient as large tables of parameters corresponding to a wide range of impairments as well as input parameters are not required.

Preferably, the iterative operations are partitioned into submethods for flexibility and to allow a computationally efficient implementation. One submethod may allow an efficient selection of the minimal spacing between signal levels to approximate the target symbol error rate. Another submethod may be used for pruning the work constellations in order to meet the power constraint. Yet another submethod may be used for efficiently modifying the work constellations to approach the power limit more closely, e.g., by increasing the minimal spacing between signal levels, or by not selecting some of the signal levels that are at the minimal spacing.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as a system, a method, or a computer program product. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses microcode to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

PCM Modem Preliminaries

The V.90 Recommendation defines universal codes (ucodes), which allow an identical description of the downstream encoder regardless of whether A-law or mu-law codes are presented at the network interface of the digital PCM modem. There are 128 ucodes, which represent the 128 nonnegative voltage levels according to the ITU-T Recommendation G.711. Given a particular PCM coding law, a ucode together with a sign bit defines the PCM code sent by the digital modem. For simplicity, the digital PCM modem can therefore be assumed to send ucodes.

In every 6T frame, blocks of K data bits are encoded by the digital PCM modem into a sequence of 6 indices $m_i, i=0 \ldots 5$, through a technique called modulus encoding. These indices satisfy $0 \leq m_i < M_i$, where M, denotes the modulus, i.e., the number of voltage levels being used in interval i. In a notation convenient for the presentation of the subject invention, the modulus encoding specified in the V.90 Recommendation can be stated as follows:

1. Represent the incoming K bits as an integer $r_0 = b_0 + b_1 2 + b_2 2^2 + \ldots b_{K-1} 2^{K-1}$.
2. Divide $r_0$ by $M_0$. The remainder of this division gives $m_0$, the quotient becomes $r_1$ for the next interval. Continue for the remaining five intervals $i=1 \ldots 5$ as follows. According to Euclid's integer division theorem, there are unique numbers $r_{i+1}$ and $m_i$ such that $r_i = M_i r_{i+1} + m_i$, where $0 < m_i < M_i$. These numbers can be written as $$m_i = r_i \bmod M_i \qquad \text{EQ.1}$$

$$r_{i+1} = \lfloor r_i / M_i \rfloor = (r_i - m_i) / \text{i } M_i. \qquad \text{EQ.2}$$

Note that the modulus encoding is invertible if, and only if, the condition $$2^K \leq \prod_{i=0}^{S} Mi \qquad \text{EQ. 3}$$

is satisfied.

Referring to the subset of non-overlapping ucodes and corresponding nonnegative voltage levels in any interval i as the available signal alphabet of interval i. Note that the available signal alphabets are not known a priori to the analog PCM modem.

The objective of the disclosed constellation generation method is to select numbers $M_i$, $i=0 \ldots 5$, and signal constellations $C_i$, $i=0 \ldots 5$, subject to various optimization criteria, where each signal constellation is comprised of a set of ucodes and corresponding voltage levels.

Since the available signal alphabets are unknown a priori, there are two possible approaches for constellation generation, model-based constellation generation (MCG) and learning-based constellation generation (LCG). Constellation generation according to the present invention can be used for both LCG and MCG. However, due to the absence of a (necessarily incomplete) impairment model, LCG is the preferred approach for constellation generation.

In model based constellation generation, the mapping between transmitted ucodes and received signal levels is represented by a small set of parameters such as a pad attenuation and, for each of the 6 intervals, an RBS type parameter. The fundamental assumption is that the mapping can be exactly parameterized and that the set of values these parameters can take is finite and known. The analog PCM modem attempts to determine the model parameters from the received V.90 digital impairment learning (DIL) signal. These parameters are then used to obtain the voltage levels corresponding to the 128 ucodes. Such extrapolated voltage levels are then used as the basis for constellation generation. An advantage of MCG is the precision of the model-based voltage levels in the case where the model parameters are identified correctly, assuming perfect fidelity of the PCM codec. In this case, the available signal alphabets are known precisely, despite the noise present on the subscriber line. The main limitation of MCG is the possibility of false model parameter identification. If the model parameters do not precisely represent the mapping from transmitted ucodes to voltage levels, systematic errors in data transmission may occur. Based on practical experience, it is impractical to define a complete model of impairments and at the same time be able to identify the model parameters with an acceptably low probability of false identification.

In learning-based constellation generation, 6 DIL constellations are estimated during start-up by learning, as described by a related application (Ser. No. 09/264,272). The 6 learned DIL constellations are used as the basis for constellation generation. There is no dependency on a precise impairment model, i. e., the parameter-based extrapolation step is avoided.

In the following, $\{L_{i,n}, n=u_{min} \ldots u_{max}\}$ denotes the set of voltage levels corresponding to the ucodes $u_{min} \ldots u_{max}$ in interval i. The levels $L_{i,n}$ may result from learning using the V.90 DIL signal in the case of LCG or from the identification of model parameters in the case of MCG.

Constellation generation selects constellations as subsets of the sets $\{L_{i,n}, n=u_{min} \ldots u_{max}\}$, taking into account the measured mean-squared error (MSE) or signal-to-noise ratio (SNR) at the equalizer output, the target symbol error probability, and other constraints.

A work constellation is a set of transmitted ucodes $\{u_{i,m}^{(TX)}\}$ and corresponding levels $\{l_{i,m}\}$ for interval i, obtained by selecting a subset of $\{L_{i,n}, n=u_{min} \ldots u_{max}\}$ with distance between levels not less than a given lower bound on minimum distance, $d_{min,LB}$ and, optionally, satisfying additional constraints to reduce the multiplicity of levels which are at distance $d_{min,LB}$ from a neighbor, or to limit the modulus $M_i$, i.e., the number of elements in the set $\{l,m\}$. The work constellations for all intervals is collectively referred to as a work constellation set.

Note that the minimum ucode $u_{min,i}$ and maximum ucode $u_{max,i}$ are selected based on various considerations such as available DIL levels, distortion at large or small DIL levels, etc. Note further that $U_{min,i}$ and $u_{max,i}$ may vary across intervals i and may also vary across different steps of the constellation generation algorithm.

During constellation generation in an analog V.90 modem, the subject invention constructs and optimizes a set of 6 work constellations simultaneously.

Submethods for Constellation Generation

A constellation generation method of the present invention may use several submethods as described in this section.

Generation of Work Constellations

In a preferred embodiment, the set of work constellations is fully specified by the parameters $d_{min,LB}$, $u_{min,i}$ and $u_{max,i}$. Note that the range of ucodes can be selected to limit the number of iterations in individual steps of the constellation generation method. By reducing the largest ucode it is possible to exclude large signal levels, which are more likely to be affected by nonlinear distortion.

Efficient Selection of $d_{min,LB}$

During constellation generation, there may be cases where $d_{min,LB}$ needs to be decreased or increased to better approximate the given constraints. During a modem start-up, it may be computationally impractical to exhaustively search for the best value of $d_{min,LB}$ in terms of approximating the desired operating point.

Figure 2:
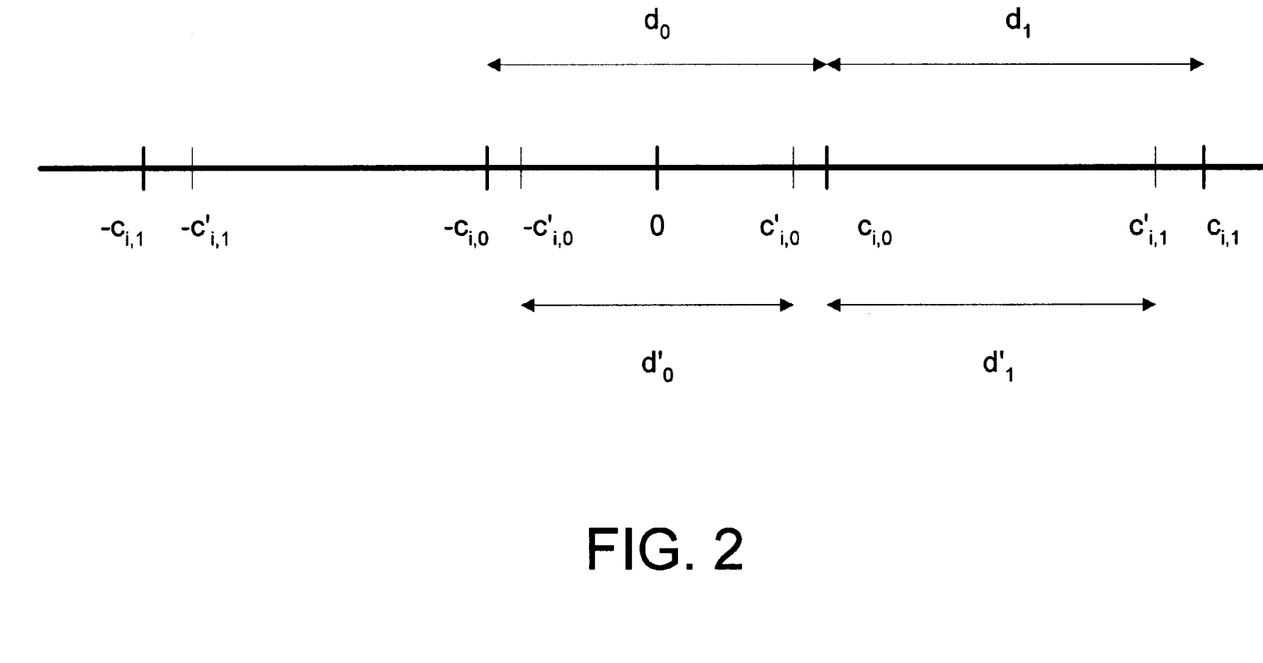
FIG. 2 illustrates a technique for reducing the minimum spacing between levels in accordance with the learned DIL levels.

One example situation where $d_{min,LB}$ may be reduced iteratively is at the beginning of constellation generation, where an initial set of work constellations is constructed based on a conservatively high value $d^0_{min,LB}$. The initial lower bound is then reduced to a value $d_{min,LB}$ by applying a small correction that is guaranteed to change the set of work constellations. (Note that an arbitrary, small reduction of the lower bound on minimum distance could still give rise to the same achieved minimum distance as before, in which case the set of work constellations would not change and computational resources would be wasted.) Let the smallest and second-smallest signal levels of a work constellation for interval i be denoted by $c_{i,0}$ and $c_{i,1}$, respectively, which are elements of the set $\{L_{i,n}, n=u_{min} \ldots u_{max}\}$. Considering that, in most cases, the minimum distance between any two points in a constellation is either the distance between the smallest level and the negative of the smallest level or the distance between the two smallest levels, a smaller minimum distance can be obtained by replacing either $c_{i,0}$ with $c'_{i,0}$ or $c_{i,1}$ with $c'_{i,1}$, in a new work constellation where $c'_{i,0}$ and $c'_{i,1}$ are the next available levels smaller than $c_{i,0}$ and $c_{i,1}$, respectively, in the set $\{L_{i,n}, n=u_{min} \ldots u_{max}\}$. This replacement of the smallest or second-smallest level with a smaller level is illustrated in FIG. 2.

Based on this consideration, one embodiment of the invention reduces the lower bound on minimum distance in accordance with the levels available in the sets $\{L_{i,n}=u_{min} \ldots u_{max}\}$ as $$d_{min,LB} = \min_{0 \leq i \leq 5} \min(2c'_{i,0}, c'_{i,1} - c_{i,0}) \qquad \text{EQ. 4}$$

Because of some rare special cases, an additional step $$d_{min,LB} \leftarrow \min(d_{min,LB}, d_{min,LB}^{(0)} - 1) \qquad \text{EQ.5}$$

is required to guarantee that the new lower bound $d_{min,LB}$ is smaller than $d^{(0)}_{min,LB}$. Note that other embodiments are possible for the operation of reducing the lower bound on minimum distance in lock step with the available levels.

Similarly, in cases where $d_{min,LB}$ needs to be increased, it is possible to replace the smallest or second-smallest level by the next larger level available in $\{L_{i,n}, n=u_{min} \ldots u_{max}\}$, which leads to efficient rules for increasing $d_{min,LB}$ in lock step with the available levels.

Pruning of Work Constellations

The submethod for pruning eliminates ucodes and corresponding levels from a work constellation set until none of the moduli can be reduced without also reducing $K=\lfloor \log_2 (P) \rfloor$ (and hence the data rate), where P is the product of the moduli $M_i$. Optionally, the power constraint $P_{avg} \leq P_{max}$ can be enforced, which may reduce K. The pruning algorithm takes advantage of the fact that a modulus $M_i$ can be decreased by 1 without decreasing K if $(M_i-1)(P-Q) \geq Q$, where $Q=2^K$. This condition is easily checked with a 16×32 bit multiplication followed by a 48-bit comparison. The pruning method PM is defined as follows:

Step PM0: Compute P, K, and $Q=2^K$.

Step PM1: Among all intervals i satisfying $(Mi-1)(P-Q) \geq Q$, remove the largest level from the work constellation set, decrease the corresponding modulus $M_j$, and update P. Repeat PM1 until $(M_i-1)(P-Q) \geq Q$ is not satisfied for any i.

Description of Method for Constellation Generation

At the beginning of constellation generation, it is usually desirable to select a minimum spacing between levels, $d_{min,LB}$, such that the set of work constellations obtained for $d_{min,LB}$ will give rise to a (non-zero) symbol error rate that is close to a desired operating point. (It is well known to those skilled in the art that for modem connections employing layer-2 error correction by means of retransmission, the optimal operating point in terms of overall data throughput is typically in the range from $10^{-6}$ to $10^{-4}$ symbol errors per second.).

For uniformly spaced signal alphabets, as in traditional quadrature amplitude modulation (QAM) systems, the computation of a suitable $d_{min,LB}$ as a function of the desired symbol error probability, the MSE, and the power limit is straightforward and well-known to those skilled in the art (Cf. John G. Proakis, Digital Communications, 1995). For nonuniformly spaced signal alphabets as employed in PCM modems, however, the symbol error probability depends on a multitude of different spacings between signal levels, where each spacing typically occurs with a different multiplicity. Moreover, these spacings and multiplicities of spacings depend on the impairments encountered on a given modem connection. In order to approach the desired operating point as closely as possible and reduce the variability of the achieved symbol error rate, it is therefore important to calculate the expected symbol error probability based on the constructed set of work constellations. Note that this calculation involves two computationally expensive operations, namely generating the set of work constellations and computing the symbol error probability based on these work constellations.

Figure 3:
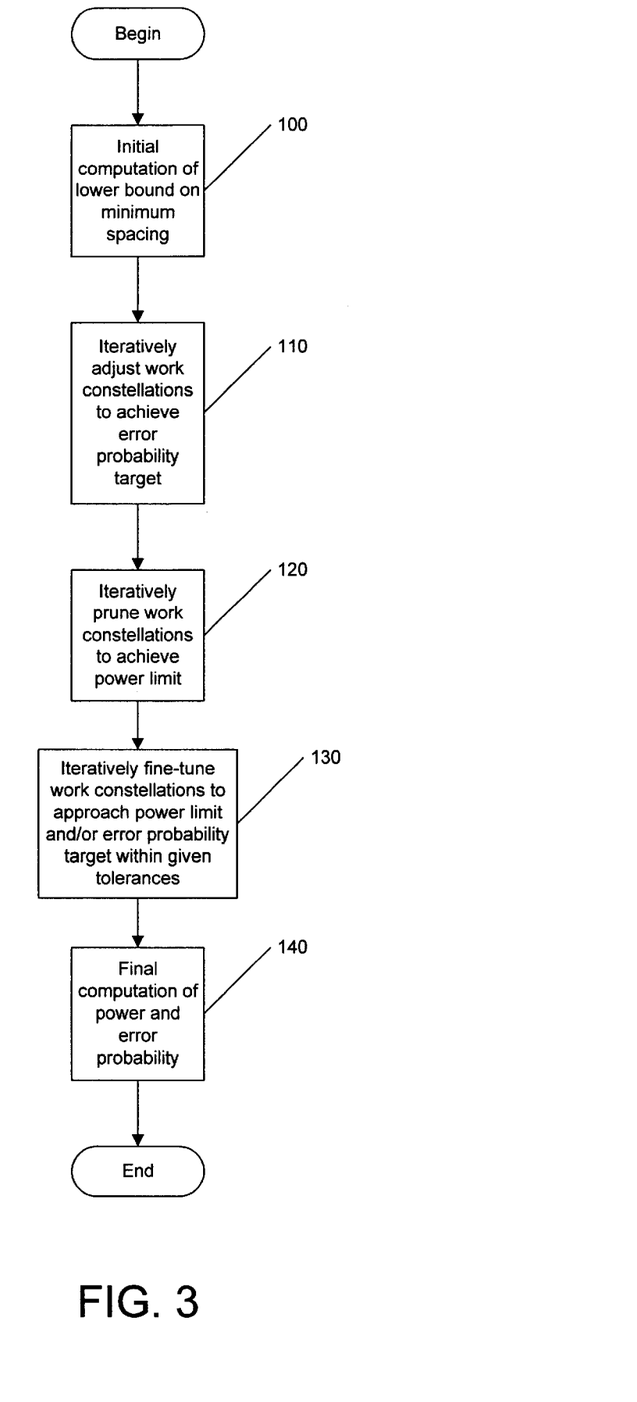
FIG. 3 is a flow chart showing a typical sequence of steps for constellation generation according to the present invention.

A preferred embodiment of the constellation generation method described in the present invention is illustrated in FIG. 3.

The input parameters for constellation generation are the MSE measured during startup, the power limit $P_{max}$, the detected pad attenuation, the target symbol error probability $P_{e,T}$, and the range of ucodes considered for constellation generation, given by $u_{min}$ and $u_{max}$. For data rate limiting in modem testing, one may also specify a maximum number of bits entering the modulus encoder, $K_{max}$.

In the first step (block 100), the input parameters are processed. A conservative value of $d_{min,LB}$ is computed based on the MSE and $P_{e,T}$. In other embodiments of this step, the initial value of $d_{min,LB}$ can be tabulated as a function of the MSE.

In the next step (block 110), the initial value of $d_{min,LB}$ is used to generate a set of work constellations for which the probability of symbol error $P_e$ is computed. Typically, the value of $P_e$ obtained after the first iteration in block 110 is considerably smaller than the target probability of error because the initial $d_{min,LB}$ was conservative. The value of $d_{min,LB}$ is iteratively reduced until the error probability slightly exceeds the target error probability. As a further modification, a $d_{min,LB}$ that is between the values computed in the last two iterations of this step can be used to approximate $d_{min,LB}$ more closely.

The next step (block 120) prunes the set of work constellations and computes average power until the power constraint is satisfied. In a preferred embodiment, the pruning iteratively removes the largest level across the six intervals until the removal of another largest level would result in a reduction of the current parameter K, at which point average power is computed and compared to the power limit. If average power exceed the power limit, K is decremented by 1 (reducing the data rate accordingly) and the above process is repeated. The last iteration in this step results in the constellation power being at or below the power limit.

The next step (block 130) is used for fine-tuning the set of work constellations to approach the power limit as closely as possible. In a preferred embodiment, this can be achieved by increasing $d_{min,LB}$ and, optionally, by reducing the multiplicities of signal levels which are at $d_{min,LB}$ with respect to a neighboring level. In practice, the number of iterations of this step can be limited by accepting a set of work constellations if the average power is within a margin (e.g., 0.25 dB) from the power limit.

In the preferred embodiment, a final step (block 140) can be used to enforce the power constraint using the exact distribution. Typically, this step does not lead to any changes in the constellation set but is added as a safety measure in case the exact distribution results in an average power exceeding the power limit while the uniform distribution did not. Note that, in all the previous steps, a close to uniform signal-point distribution is maintained, simplifying the computation of both error probability and power.

The present invention has been described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The flowchart of FIG. 3 illustrates the architecture, functionality, and operation of a possible implementation of the client modem receiver software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described herein above without substantially departing from the principles of the present invention. All such variations and modifications are intended to be included herein within the scope of the present invention, as set forth in the following claims.

That which is claimed is:

1. A method for constellation generation comprising the steps of:
    determining initial ucode boundaries;
    determining an initial minimum signal level spacing;
    generating a work constellation set based on the initial ucode boundaries and the initial minimum signal level spacing;
    iteratively adjusting the work constellation set so as to provide an adjusted work constellation set which achieves an error probability target; and
    iteratively pruning the adjusted work constellation set so as to provide a pruned work constellation set which achieves a power limit.

2. A method according to claim 1, further comprising the step of iteratively fine-tuning the pruned work constellation set so as to provide a final constellation set which is within a specified tolerance of the error probability target and/or the power limit.

3. A method according to claim 2, further comprising the step of enforcing the power limit and/or the symbol error probability utilizing an exact distribution of the final constellation set.

4. A method according to claim 2, wherein the final work constellation set has a non-uniformly spaced signal-point distribution.

5. A method according to claim 1, wherein the initial minimum signal level spacing is established as a function of mean squared error.

6. A method according to claim 1, wherein the step of determining an initial minimum signal level spacing comprises determining a minimum signal level spacing based on mean square error and a target symbol error probability.

7. A method according to claim 1, wherein the step of iteratively adjusting the work constellation set comprises the step of iteratively reducing the minimum signal level spacing.

8. A method according to claim 7, wherein the minimum signal level spacing is reduced by determining $$d_{\min,LB} = \min_{0 \le i \le 5} \min(2c'_{i,0}, c'_{i,1} - c_{i,0})$$

where $d_{min,LB}$ is the minimum signal level spacing and $c'_{i0}$ and $c'_{i1}$ are reduced smallest and second smallest signal levels and $c_{i,0}$ is a previous smallest signal level of the adjusted work constellation set and wherein i is a frame interval.

9. A method according to claim 7, wherein the step of iteratively reducing the minimum signal level spacing comprises the step of iteratively reducing the minimum signal level spacing until the symbol error probability of the work constellation set slightly exceeds a target symbol error probability.

10. A method according to claim 9, wherein the step of iteratively reducing the signal level spacing further comprises the step of setting the minimum signal level spacing to a value between a first minimum signal level spacing which results in a work constellation set with a symbol error probability below the target symbol error probability and the minimum signal level spacing which results in the symbol error probability of the work constellation set slightly exceeding the target symbol error probability.

11. A method according to claim 9, wherein the step of iteratively reducing the minimum signal level spacing until the symbol error probability of the work constellation set slightly exceeds a target symbol error probability comprises the steps of:
    reducing the minimum signal level spacing;
    generating a temporary adjusted work constellation set having a substantially uniform signal-point spacing;
    determining the symbol error probability of the temporary adjusted work constellation;
    comparing the determined symbol error probability with the target symbol error probability;
    repeating the steps of reducing, generating, determining and comparing until the determined symbol error probability is equal to or slightly higher than the target symbol error probability; and
    establishing the temporary adjusted work constellation set as the adjusted work constellation set when the determined symbol error probability is equal to or slightly higher than the target symbol error probability.

12. A method according to claim 11, wherein the step of determining the symbol error probability assumes a uniform signal-point distribution for the temporary adjusted work constellation.

13. A method according to claim 1, wherein the step of iteratively adjusting the work constellation set comprises the step of iteratively increasing the minimum signal level spacing.

14. A method according to claim 13, wherein the minimum signal level spacing is increased by determining $$d_{\min,LB} = \min_{0 \le i \le 5} \min(2c'_{i,0}, c'_{i,1} - c_{i,0})$$

where $d_{min,LB}$ is the minimum signal level spacing and $c'_{i0}$ and $c'_{i1}$ are increased smallest and second smallest signal levels and $c_{i,0}$ is a previous smallest signal level of the adjusted work constellation set and wherein i is a frame interval.

15. A method according to claim 13, wherein the step of iteratively increasing the minimum signal level spacing comprises the step of iteratively increasing the minimum signal level spacing until the symbol error probability of the work constellation set is slightly below a target symbol error probability.

16. A method according to claim 2, wherein the step of iteratively fine-tuning the pruned work constellation set so as to provide a final constellation set which is within a specified tolerance of the error probability target and/or the power limit comprises the step of increasing the minimum signal level spacing until the constellation power of the pruned work constellation set is within a threshold value of the power limit.

17. A method according to claim 16, wherein the step of iteratively fine-tuning the pruned work constellation set so as to provide a final constellation set which is within a specified tolerance of the error probability target and/or the power limit further comprises the step of reducing a multiplicity of ucodes which are at the minimum signal level spacing with respect to a neighboring ucode.

18. A method according to claim 1, wherein the step of iteratively pruning the adjusted work constellation set comprises the step of iteratively eliminating a largest signal level in the adjusted work constellation set.

19. A method according to claim 18, wherein the step of iteratively eliminating the largest signal level in the adjusted work constellation set comprises the step of iteratively eliminating the largest signal level in the adjusted work constellation set until the elimination of the largest signal level results in a constellation power of the adjusted work constellation set being below the power limit.

20. A method according to claim 18, wherein the step of iteratively eliminating a largest signal level in the adjusted work constellation set comprises the step of iteratively eliminating a largest signal level in the adjusted work constellation set so as to provide a pruned work constellation set having a substantially uniform point-signal spacing.

21. A method according to claim 20, wherein the largest level is the largest level satisfying $(M_i-1)(P-Q) \geq Q$ wherein $M_i$ is a number of levels available in a frame interval i, P is the product of $M_i$ for the frame intervals and Q is $2^K$ where $K=\lfloor \log2(P) \rfloor$.

22. A method according to claim 20, wherein the step of iteratively eliminating a largest signal level in the adjusted work constellation set so as to provide a pruned work constellation set having a substantially uniform point-signal spacing comprises the steps of:
removing the largest signal level across the frame intervals of the adjusted work constellation set until removal of another largest signal level would result in a reduction of K, where $K=\lfloor \log2(P) \rfloor$, P is the product of $M_i$ for the frame intervals and $M_i$ is a number of levels available in a frame interval i to provide a temporary pruned work constellation set;
determining an average power of the temporary pruned work constellation set;
comparing the determined average power of the temporary pruned work constellation set to the power limit;
reducing K and repeating the steps of removing, determining and comparing if the determined average power is greater than the power limit; and
establishing the temporary pruned work constellation set as the pruned work constellation set if the determined average power is not greater than the power limit.

23. A method according to claim 22, wherein the step of determining an average power assumes a uniform signal-point distribution for the temporary pruned work constellation set.

24. A system for constellation generation comprising:
means for determining initial ucode boundaries;
means for determining an initial minimum signal level spacing;
means for generating a work constellation set based on the initial ucode boundaries and the initial minimum signal level spacing;
means for iteratively adjusting the work constellation set so as to provide an adjusted work constellation set which achieves an error probability target; and
means for iteratively pruning the adjusted work constellation set so as to provide a pruned work constellation set which achieves a power limit.

25. A system according to claim 24, further comprising means for iteratively fine-tuning the pruned work constellation set so as to provide a final constellation set which is within a specified tolerance of the error probability target and/or the power limit.

26. A system according to claim 25, further comprising means for enforcing the power limit and/or error probability target utilizing an exact signal-point distribution of the final constellation set.

27. A system according to claim 25, wherein the final work constellation set has a non-uniformly spaced signal-point distribution.

28. A system according to claim 24, wherein the initial minimum signal level spacing is established as a function of mean squared error.

29. A system according to claim 24, wherein the means for determining an initial minimum signal level spacing comprises means for determining a minimum signal level spacing based on mean square error and a target symbol error probability.

30. A system according to claim 24, wherein the means for iteratively adjusting the work constellation set comprises means for iteratively reducing the minimum signal level spacing.

31. A system according to claim 30, wherein the minimum signal level spacing is reduced by determining $$d_{\min,LB} = \min_{0 \leq i \leq 5} \min(2c'_{i,0}, c'_{i,1} - c_{i,0})$$

where $d_{min,Lb}$ is the minimum signal level spacing and $c'_{i0}$ and $c'_{i1}$ are reduced smallest and second smallest signal levels and $c_{i,0}$ is a previous smallest signal level of the adjusted work constellation set and wherein i is a frame interval.

32. A system according to claim 30, wherein the means for iteratively reducing the minimum signal level spacing comprises means for iteratively reducing the minimum signal level spacing until the symbol error probability of the work constellation set slightly exceeds a target symbol error probability.

33. A system according to claim 32, wherein the means for iteratively reducing the signal level spacing further comprises means for setting the minimum signal level spacing to a value between a first minimum signal level spacing which results in a work constellation set with a symbol error probability below the target symbol error probability and the minimum signal level spacing which results in the symbol error probability of the work constellation set slightly exceeding the target symbol error probability.

34. A system according to claim 32, wherein the means for iteratively reducing the minimum signal level spacing until the symbol error probability of the work constellation set slightly exceeds a target symbol error probability comprises:
means for reducing the minimum signal level spacing;
means for generating a temporary adjusted work constellation set having a substantially uniform signal-point spacing;
means for determining the symbol error probability of the temporary adjusted work constellation set;

means for comparing the determined symbol error probability with the target symbol error probability;

means for repeating the reduction of the minimum signal level spacing, the generation of a temporary adjusted work constellation set, the determination of the symbol error probability and the comparison with the target symbol error probability until the determined symbol error probability is equal to or slightly higher than the target symbol error probability; and means for establishing the temporary adjusted work constellation set as the adjusted work constellation set when the determined symbol error probability is equal to or slightly higher than the target symbol error probability.

35. A system according to claim 34, wherein the means for determining the symbol error probability assumes a uniform symbol-point spacing in the temporary adjusted work constellation set.

36. A system according to claim 24, wherein the means for iteratively adjusting the work constellation set comprises means for iteratively increasing the minimum signal level spacing.

37. A system according to claim 36, wherein the minimum signal level spacing is increased by determining $$d_{min,LB} = \min_{0 \leq i \leq 5} \min(2c'_{i,0}, c'_{i,1} - c_{i,0})$$

where $d_{min,LB}$ is the minimum signal level spacing and $c'_{i0}$ and $c'_{i1}$ are increased smallest and second smallest signal levels and $c_{i,0}$ is a previous smallest signal level of the adjusted work constellation set and wherein i is a frame interval.

38. A system according to claim 36, wherein the means for iteratively increasing the minimum signal level spacing comprises means for iteratively increasing the minimum signal level spacing until the symbol error probability of the work constellation set is slightly below a target symbol error probability.

39. A system according to claim 25, wherein the means for iteratively fine-tuning the pruned work constellation set so as to provide a final constellation set which is within a specified tolerance of the error probability target and/or the power limit comprises means for increasing the minimum signal level spacing until the constellation power of the pruned work constellation set is within a threshold value of the power limit.

40. A system according to claim 39, wherein the means for iteratively fine-tuning the pruned work constellation set so as to provide a final constellation set which is within a specified tolerance of the error probability target and/or the power limit further comprises means for reducing a multiplicity of ucodes which are at the minimum signal level spacing with respect to a neighboring ucode.

41. A system according to claim 24, wherein the means for iteratively pruning the adjusted work constellation set comprises means for iteratively eliminating a largest signal level in the adjusted work constellation set.

42. A system according to claim 41, wherein the means for iteratively eliminating the largest signal level in the adjusted work constellation set comprises means for iteratively eliminating the largest signal level in the adjusted work constellation set until the elimination of the largest signal level results in a constellation power of the adjusted work constellation set being below the power limit.

43. A system according to claim 41, wherein the means for iteratively eliminating a largest signal level in the adjusted work constellation set comprises means for iteratively eliminating a largest signal level in the adjusted work constellation set so as to provide a pruned work constellation set having a substantially uniform point-signal spacing.

44. A system according to claim 43, wherein the largest level is the largest level satisfying $(M_i-1)(P-Q) \geq Q$ wherein $M_i$ is a number of levels available in a frame interval i, P is the product of $M_i$ for the frame intervals and Q is $2^K$ where $K = \lfloor \log2(P) \rfloor$.

45. A system according to claim 43, wherein the means for iteratively eliminating a largest signal level in the adjusted work constellation set so as to provide a pruned work constellation set having a substantially uniform point-signal spacing comprises:

means for removing the largest signal level across the frame intervals of the adjusted work constellation set until removal of another signal largest level would result in a reduction of K, where $K = \lfloor \log2(P) \rfloor$, P is the product of $M_i$ for the frame intervals and $M_i$ is a number of levels available in a frame interval i to provide a temporary pruned work constellation set;

means for determining an average power of the temporary pruned work constellation set;

means for comparing the determined average power of the temporary pruned work constellation set to the power limit;

means for reducing K and repeating removal of largest signal levels, the determination of an average power and the comparison with the power limit if the determined average power is greater than the power limit; and means for establishing the temporary pruned work constellation set as the pruned work constellation set if the determined average power is not greater than the power limit.

46. A system according to claim 45 wherein the means for determining an average power assumes a uniform signal-point distribution in the temporary pruned work constellation set.

47. A computer program product for constellation generation comprising:

a computer-readable storage medium having computer readable program code embodied in said medium, said computer-readable program code comprising:

computer-readable program code for determining initial ucode boundaries;

computer-readable program code for determining an initial minimum signal level spacing;

computer-readable program code for generating a work constellation set based on the initial ucode boundaries and the initial minimum signal level spacing;

computer-readable program code for iteratively adjusting the work constellation set so as to provide an adjusted work constellation set which achieves an error probability target; and computer-readable program code for iteratively pruning the adjusted work constellation set so as to provide a pruned work constellation set which achieves a power limit.

48. A computer program product according to claim 47, further comprising computer-readable program code for iteratively fine-tuning the pruned work constellation set so as to provide a final constellation set which is within a specified tolerance of the error probability target and/or the power limit.

49. A computer program product according to claim 48, further comprising computer-readable program code for enforcing the power limit and/or the error probability target utilizing an exact signal-point distribution of the final constellation set.

50. A computer program product according to claim 48, wherein the final work constellation set has a non-uniformly spaced signal-point distribution.

51. A computer program product according to claim 47, wherein the initial minimum signal level spacing is established as a function of mean squared error.

52. A computer program product according to claim 47, wherein the computer-readable program code for determining an initial minimum signal level spacing comprises computer-readable program code for determining a minimum signal level spacing based on mean square error and a target symbol error probability.

53. A computer program product according to claim 47, wherein the computer-readable program code for iteratively adjusting the work constellation set comprises computer-readable program code for iteratively reducing the minimum signal level spacing.

54. A computer program product according to claim 53, wherein the minimum signal level spacing is reduced by determining $$d_{min,LB} = \min_{0 \leq i \leq 5} \min(2c'_{i,0}, c'_{i,1} - c_{i,0})$$

where $d_{min,LB}$ is the minimum signal level spacing and $c'_{i0}$ and $c'_{i1}$ are reduced smallest and second smallest signal levels and $c_{i,0}$ is a previous smallest signal level of the adjusted work constellation set and wherein i is a frame interval.

55. A computer program product according to claim 53, wherein the computer-readable program code for iteratively reducing the minimum signal level spacing comprises computer-readable program code for iteratively reducing the minimum signal level spacing until the symbol error probability of the work constellation set slightly exceeds a target symbol error probability.

56. A computer program product according to claim 55, wherein the computer-readable program code for iteratively reducing the signal level spacing further comprises computer-readable program code for setting the minimum signal level spacing to a value between a first minimum signal level spacing which results in a work constellation set with a symbol error probability below the target symbol error probability and the minimum signal level spacing which results in the symbol error probability of the work constellation set slightly exceeding the target symbol error probability.

57. A computer program product according to claim 55, wherein the computer-readable program code for iteratively reducing the minimum signal level spacing until the symbol error probability of the work constellation set slightly exceeds a target symbol error probability comprises:

computer-readable program code for reducing the minimum signal level spacing;

computer-readable program code for generating a temporary adjusted work constellation set having a substantially uniform signal-point spacing;

computer-readable program code for determining the symbol error probability of the temporary adjusted work constellation set;

computer-readable program code for comparing the determined symbol error probability with the target symbol error probability;

computer-readable program code for repeating the reduction of the minimum signal level spacing, the generation of a temporary adjusted work constellation set, the determination of the symbol error probability and the comparison with the target symbol error probability until the determined symbol error probability is equal to or slightly higher than the target symbol error probability; and computer-readable program code for establishing the temporary adjusted work constellation set as the adjusted work constellation set when the determined symbol error probability is equal to or slightly higher than the target symbol error probability.

58. A computer program product according to claim 57, wherein the computer-readable program code for determining the symbol error probability assumes a uniform signal-point distribution of the temporary adjusted work constellation set.

59. A computer program product according to claim 47, wherein the computer-readable program code for iteratively adjusting the work constellation set comprises computer-readable program code for iteratively increasing the minimum signal level spacing.

60. A computer program product according to claim 59, wherein the minimum signal level spacing is increased by determining $$d_{min,LB} = \min_{0 \leq i \leq 5} \min(2c'_{i,0}, c'_{i,1} - c_{i,0})$$

where $d_{min,LB}$ is the minimum signal level spacing and $c'_{i0}$ and $c'_{i1}$ are increased smallest and second smallest signal levels and $c_{i,0}$ is a previous smallest signal level of the adjusted work constellation set and wherein i is a frame interval.

61. A computer program product according to claim 59, wherein the computer-readable program code for iteratively increasing the minimum signal level spacing comprises computer-readable program code for iteratively increasing the minimum signal level spacing until the symbol error probability of the work constellation set is slightly below a target symbol error probability.

62. A computer program product according to claim 48, wherein the computer-readable program code for iteratively fine-tuning the pruned work constellation set so as to provide a final constellation set which is within a specified tolerance of the error probability target and/or the power limit comprises computer-readable program code for increasing the minimum signal level spacing until the constellation power of the pruned work constellation set is within a threshold value of the power limit.

63. A computer program product according to claim 62, wherein the computer-readable program code for iteratively fine-tuning the pruned work constellation set so as to provide a final constellation set which is within a specified tolerance of the error probability target and/or the power limit further comprises computer-readable program code for reducing a multiplicity of ucodes which are at the minimum signal level spacing with respect to a neighboring ucode.

64. A computer program product according to claim 47, wherein the computer-readable program code for iteratively pruning the adjusted work constellation set comprises computer-readable program code for iteratively eliminating a largest signal level in the adjusted work constellation set.

65. A computer program product according to claim 64, wherein the computer-readable program code for iteratively eliminating the largest signal level in the adjusted work constellation set comprises computer-readable program code for iteratively eliminating the largest signal level in the adjusted work constellation set until the elimination of the largest signal level results in a constellation power of the adjusted work constellation set being below the power limit.

66. A computer program product according to claim 64, wherein the computer-readable program code for iteratively eliminating a largest signal level in the adjusted work constellation set comprises computer-readable program code for iteratively eliminating a largest signal level in the adjusted work constellation set so as to provide a pruned work constellation set having a substantially uniform point-signal spacing.

67. A computer program product according to claim 66, wherein the largest level is the largest level satisfying $(M_i-1)(P-Q) \geq Q$ wherein $M_i$ is a number of levels available in a frame interval i, P is the product of $M_i$ for the frame intervals and Q is $2^K$ where $K=\lfloor \log 2(P) \rfloor$.

68. A computer program product according to claim 66, wherein the computer-readable program code for iteratively eliminating a largest signal level in the adjusted work constellation set so as to provide a pruned work constellation set having a substantially uniform point-signal spacing comprises:

computer-readable program code for removing the largest signal level across the frame intervals of the adjusted work constellation set until removal of another signal largest level would result in a reduction of K, where $K=\lfloor \log 2(P) \rfloor$, P is the product of $M_i$ for the frame intervals and $M_i$ is a number of levels available in a frame interval i to provide a temporary pruned work constellation set;

computer-readable program code for determining an average power of the temporary pruned work constellation set;

computer-readable program code for comparing the determined average power of the temporary pruned work constellation set to the power limit;

computer-readable program code for reducing K and repeating removal of largest signal levels, the determination of an average power and the comparison with the power limit if the determined average power is greater than the power limit; and computer-readable program code for establishing the temporary pruned work constellation set as the pruned work constellation set if the determined average power is not greater than the power limit.

69. A computer program product according to claim 68, wherein the computer-readable program code for determining average power assumes a uniform signal-point distribution of the temporary pruned work constellation.

* * * * *